United States Patent [19]

Davis et al.

[11] 4,338,646

[45] Jul. 6, 1982

[54] CURRENT LIMITING CIRCUIT

[75] Inventors: William F. Davis, Tempe; Robert N. Dotson, Mesa, both of Ariz.

[73] Assignee: Motorola, Inc., Schaumburg, Ill.

[21] Appl. No.: 257,837

[22] Filed: Apr. 27, 1981

[51] Int. Cl.$^3$ ............................................. H02H 3/08
[52] U.S. Cl. .................................... 361/18; 361/88; 361/86; 361/91; 361/93; 330/298; 330/207 P; 323/276; 323/315
[58] Field of Search ...................... 361/18, 88, 91, 90, 361/86, 93, 98; 330/298, 207 P; 323/276, 279, 315, 316

[56] References Cited

U.S. PATENT DOCUMENTS

| | | | |
|---|---|---|---|
| 3,801,894 | 4/1974 | Spiegel | 361/18 X |
| 3,886,410 | 5/1975 | Seer, Jr. | 323/276 X |
| 4,053,996 | 10/1977 | Schertz et al. | 330/207 P X |
| 4,254,372 | 3/1981 | Moore, Jr. | 361/18 X |

*Primary Examiner*—Patrick R. Salce
*Attorney, Agent, or Firm*—Vincent B. Ingrassia

[57] ABSTRACT

A current limiting circuit is provided wherein the monitored voltage is applied to the base of first and second transistors, the first transistor having a substantially larger emitter area than the second transistor. Impedance means are connected to the emitters of the first and second transistors such that they function in conjunction with the emitter area ratio causing the current flowing through the first transistor to be higher than that flowing through the second transistor at low base voltages, while at higher base voltages the current flowing through the second transistor is higher than flowing through the first transistor. At some intermediate voltage the current flowing through both the first and second transistors is equal. This property may be used, for example, in a voltage regulator so as to divert base drive current from the output transistor at the point where the first and second currents are equal.

7 Claims, 3 Drawing Figures

CURRENT LIMITING CIRCUIT

BACKGROUND OF THE INVENTION

1. Field of the Invention

This invention relates generally to current limiting circuits and, more particularly, to a current limiting circuit which does not employ a series sense resistor for sampling the output current thus achieving a better input-output voltage differential and/or a greater output voltage swing.

2. Description of the Prior Art

Circuits such as voltage regulators require means for limiting current in the event that the circuit's output becomes shorted. A typical voltage regulator circuit includes a series pass transistor which is controlled by the output of an amplifier. The transistor output is then fed back to an input of the amplifier. If the output were to become shorted without any current limiting circuitry, the amplifier could generate an output which would turn the output transistor on to an extent which could be damaging.

In the past, this problem has been avoided by placing a current limit resistor in series with the series pass transistor to sample the current. As an example, the base and emitter terminals of a current limit transistor is connected across a resistor in the emitter of the series pass transistor and the collector of the current limit transistor is coupled to the base of the series pass transistor. In this manner, if the circuit output is shorted, the circuit limit transistor would turn on when the voltage drop across the resistor reached the base-emitter voltage ($V_{BE}$) of the current limit transistor and would thereby divert current away from the base of series transistor. Thus, the output current could not exceed $V_{BE}/R$ where R is the resistance of the resistor.

There are several problems associated with the use of a resistor in the emitter path of the output transistor to sample the current for current limiting purposes. First, there will always be a voltage drop across the resistor even when the circuit is not operating in the current limit mode; i.e., when the voltage drop across the resistor does not exceed the base-emitter voltage of the current limit transistor (typically 0.7 volts). This increases the input-output voltage differential resulting in increased power dissipation. Further, in circuits such as operational amplifiers, it is desirable that the output exhibit as large a voltage swing as possible. The voltage drop across the series resistor limits the output voltage swing.

There has been an attempt to avoid these problems by employing current limiting circuits which are rendered operative in response to a voltage which is a fraction of the base-emitter voltage. Thus, the voltage drop across the resistor is substantially less. However, such attempts have resulted in circuitry which is more complex and costly than conventional approaches.

SUMMARY OF THE INVENTION

It is an object of the present invention to provide an improved current limiting circuit.

It is a further object of the present invention to provide an improved voltage regulator circuit which avoids the use of a series resistor to sample the output current.

It is a still further object of the present invention to provide a current limiting circuit which provides better input-output voltage differential and/or allows for higher output voltage swing.

According to a first aspect of the invention there is provided a circuit for monitoring the base-emitter voltage of a transistor for limiting the current therethrough, comprising: a first transistor having base, emitter and collector terminals; a first source of current coupled to said first transistor for supplying base drive to said first transistor; a second transistor having a collector for conducting a first current, a base coupled to the base of said first transistor, and an emitter having a first area; a third transistor having a collector for conducting a second current, a base coupled to the base of said first transistor, and an emitter having a second area, said first area being substantially larger than said second area; impedance means coupled between the emitters of said second and third transistors and the emitter of said first transistor, said impedance means and said first and second areas causing said first and second currents to be substantially equal at a predetermined value of the base-emitter voltage of said first transistor; and means for reducing the base drive to said first transistor when said first current is substantially equal to said second current.

According to a further aspect of the invention there is provided a current-limited voltage regulator, comprising: voltage regulator means adapted to receive a reference voltage and for producing a regulated output voltage; current source means coupled to said voltage regulator means and responsive to an input voltage for supplying a drive current to said voltage regulator means; a first transistor for conducting a first current therethrough having a base coupled to said voltage regulator means and receiving therefrom a first voltage proportional to said regulated output voltage, a collector, and an emitter having a first area; a second transistor for conducting a second current therethrough having a base coupled to said first voltage, a collector and an emitter having a second area, said first area being substantially larger than said second area; current diverting means coupled to the collector of said first transistor, said current source means and said voltage regulator means; impedance means coupled to the emitters of said first and second transistors, said impedance means and said first and second areas reducing said first current with respect to said second current as said first voltage increases; and current mirror means coupled to said first transistor, said second transistor and said current diverting means for diverting drive current from said voltage regulator means when said first current falls below said second current.

The above, and other objects, features and advantages of the present invention will be more clearly understood from the following detailed description taken in conjunction with the accompanying drawings, in which:

DESCRIPTION OF THE PREFERRED EMBODIMENT

Figure 1:
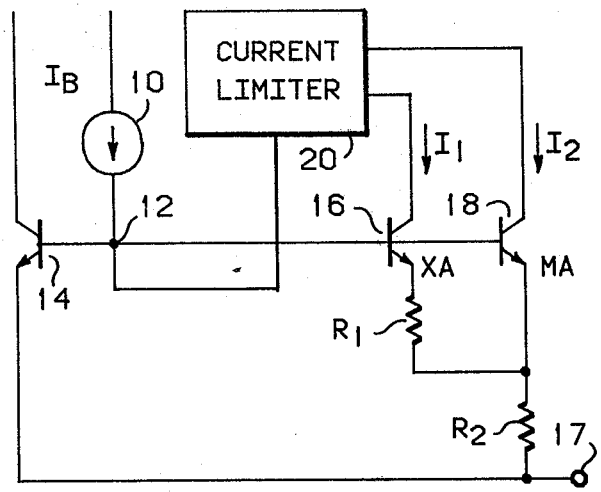
FIG. 1 is a schematic diagram illustrating the principle upon which the invention is based.
Figure 2:
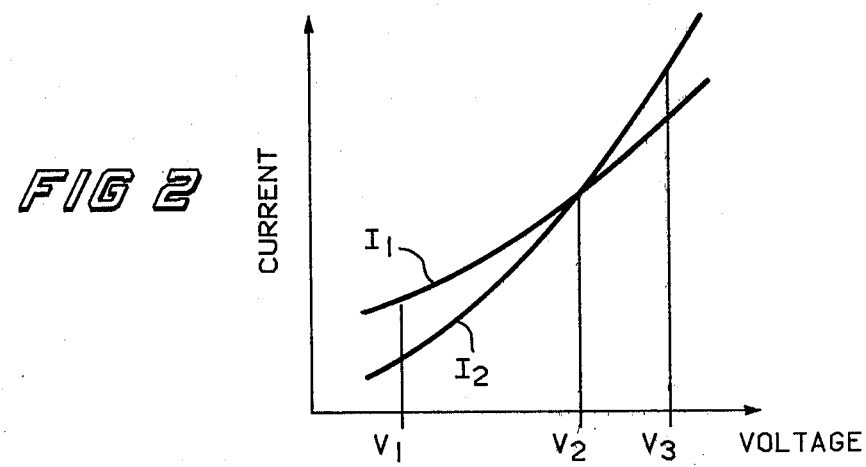
FIG. 2 illustrates curves which aid in the explanation of the circuit shown in FIG. 1.

Referring to FIG. 1, there is a shown a base current source 10 for supplying base drive to transistor 14 which is merely representative of an output circuit which is to be monitored for current limiting purposes. Node 12 is coupled to the base electrodes of transistors 14, 16 and 18 and to base current source 10. The emitter of transistor 14 is coupled to output terminal 17 as is one end of resistor $R_2$. The collector of transistor 16 receives a first current $I_1$, and the collector of transistor 18 receives a second current $I_2$. The emitter of transistor 16 which has an emitter area XA is coupled via resistors $R_1$ and $R_2$ to the output. The emitter of transistor 18 having an area MA is coupled via resistor $R_2$ to the output. If we assume X is much greater than M (e.g., X=10 and M=1), then it should be clear that if the voltage at node 12 is very small, currents $I_1$ and $I_2$ will also be very small. If this is the case, the voltage drops through resistors $R_1$ and $R_2$ will be negligible. Since the emitter area of transistor 16 is ten times that of transistor 18, $I_1$ will be much larger than $I_2$. This is illustrated in FIG. 2 at voltage $v_1$. On the other hand, as the voltage at node 12 increases, currents $I_1$ and $I_2$ will also increase. Beyond a given voltage ($v_2$), $I_2$ will exceed $I_1$ as is shown at voltage $v_3$ in FIG. 2 because the drops across the resistors become significant and dictate the current flow. It is apparent that at some voltage ($v_2$), currents $I_1$ and $I_2$ will be equal. It is the detection of this point which may be used for current limiting purposes. For example in FIG. 1, when $I_2$ is greater than $I_1$, the current limiter 20 would detect the equality and cause base drive $I_B$ to be reduced to limit the current flowing through transistor 14.

Figure 3:
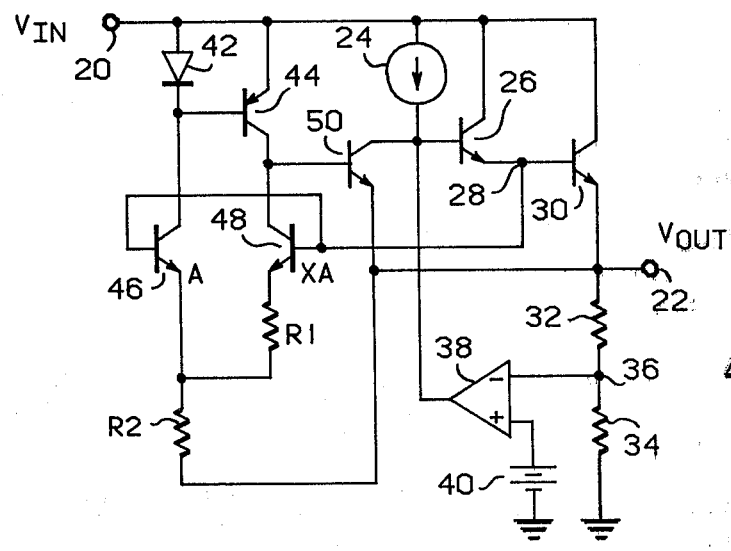
FIG. 3 is a schematic diagram of a voltage regulator utilizing the circuitry of the present invention.

FIG. 3 is a schematic diagram of a voltage regulator employing the above described current limiting scheme. The regulator receives a voltage at input terminal 20 and produces a regulated output voltage at terminal 22. The regulator portion of the circuit includes a current source 24 which, in the normal mode, supplies base current to transistor 26 which has a collector coupled to $V_{in}$ and an emitter coupled to node 28 and to the base of output transistor 30. The collector of output transistor 30 is coupled to $V_{in}$, and its emitter is coupled to output terminal 22 at which the output voltage ($V_{out}$) appears. Resistors 32 and 34 provide a voltage at junction node 36 which is supplied to the inverting input of an error amplifier 38. The non-inverting input is coupled to a reference voltage 40, and the output of the error amplifier is coupled to the base of transistor 26. This circuit operates to detect differences between the reference voltage 40 and the voltage at node 36. Error amplifier 38 then generates a signal which is proportional to the difference and alters the base drive to transistor 26 which in turns alters the base drive to output transistor 30. In this way, the output voltage ($V_{out}$) may be adjusted to assure that the voltage at node 36 is equal to the reference voltage 40.

As was described earlier, it is important to provide current limiting means in the event that the output of the regulator should become shorted. To this end, there is provided a current mirror circuit including diode 42 and transistor 44, a first transistor 46 having an emitter area A, a second transistor 48 having an emitter area XA where X is some positive number (e.g. 10), and resistors $R_1$ and $R_2$. An additional transistor 50 has a base coupled to the collectors of transistors 44 and 48, a collector coupled to the current source 24 and an emitter coupled to the output voltage. This portion of the circuit operates as follows.

The voltage at node 28 is applied to the base electrodes of transistors 46 and 48. If this voltage is below some predetermined value, the current flowing through transistor 48 will be larger than that flowing through transistor 46 as described previously. The current mirror circuit comprising diodes 42 and transistor 44 will reproduce the current flowing through transistor 46 at the collector of transistor 44. However, since transistor 48 is sinking more current than is being produced at the collector of transistor 44, the voltage at the base of transistor 50 will remain low and transistor 50 will remain off.

When the voltage at node 28 exceeds some predetermined value at which current limiting is to take place, the current flowing through transistor 46 will exceed that flowing through transistor 48 as described earlier. Thus, transistor 44 will mirror a larger current than that which is flowing through transistor 48 causing the voltage at the base of transistor 50 to rise. This will in turn cause transistor 50 to turn on and divert current being supplied by current source 24 away from the base of transistor 26 and through transistor 50. In this manner, the output transistor is protected in the event of a short circuit.

The above description is given by way of example only. Changes in forms and details may be made by one skilled in the art without departing from the scope of the invention.

We claim:

1. A circuit for monitoring the base-emitter voltage of a transistor for limiting the current therethrough, comprising:

a first transistor having base, emitter and collector terminals;

a first source of current coupled to said first transistor for supplying base drive to said first transistor;

a second transistor having a collector for conducting a first current, a base coupled to the base of said first transistor, and an emitter having a first area;

a third transistor having a collector for conducting a second current, a base coupled to the base of said first transistor, and an emitter having a second area, said first area being substantially larger than said second area;

impedance means coupled between the emitters of said second and third transistors and the emitter of said first transistor, said impedance means and said first and second areas causing said first and second currents to be substantially equal at a predetermined value of the base-emitter voltage of said first transistor; and means for reducing the base drive to said first transistor when said first current is substantially equal to said second current.

2. A circuit according to claim 1 wherein said impedance means comprises:

a first resistor coupled between the emitter of said third transistor and the emitter of said first transistor; and a second resistor coupled between the emitter of said second transistor and the emitter of said third transistor such that at low values of said base-emitter voltage, said first current is larger than said second current and at high values of said base-emitter voltage, said first current is less than said second current.

3. A current-limited voltage regulator, comprising:

voltage regulator means adapted to receive a reference voltage and for producing a regulated output voltage;

current source means coupled to said voltage regulator means and responsive to an input voltage for supplying a drive current to said voltage regulator means;

a first transistor for conducting a first current therethrough having a base coupled to said voltage regulator means and receiving therefrom a first voltage proportional to said regulated output voltage, a collector, and an emitter having a first area;

a second transistor for conducting a second current therethrough having a base coupled to said first voltage, a collector and an emitter having a second area, said first area being substantially larger than said second area;

current diverting means coupled to the collector of said first transistor, said current source means and said voltage regulator means;

impedance means coupled to the emitters of said first and second transistors, said impedance means and said first and second areas reducing said first current with respect to said second current as said first voltage increases; and current mirror means coupled to said first transistor, said second transistor and said current diverting means for diverting drive current from said voltage regulator means when said first current falls below said second current.

4. A current limited voltage regulator according to claim 3 wherein said current diverting means comprises a current limiting transistor having a base coupled to the collector of said first transistor, an emitter coupled to said output and a collector coupled to said current source means and said voltage regulator means.

5. A current-limited voltage regulator according to claim 4 wherein said impedance means comprises:

a first resistor coupled between the emitter of said second transistor and said output; and a second resistor coupled between the emitter of said first transistor and the emitter of said second transistor.

6. A current-limited voltage regulator according to claim 5 wherein said voltage regulator means comprises:

a third transistor having a base coupled to said current source means for receiving drive current therefrom, a collector adapted to receive said input voltage and an emitter coupled to the bases of said first and second transistors;

an output transistor having a base coupled to the emitter of said third transistor, a collector adapted to be coupled to said input voltage, and an emitter coupled to said output voltage;

comparing means coupled to said output transistor and to the base of said third transistor for comparing said output voltage with a reference voltage and for generating an output signal which is proportional to the difference therebetween, said output signal for altering the base drive to said third transistor.

7. A current limited voltage regulator according to claim 6 wherein said current mirror means comprises:

a diode having an anode coupled to said input voltage and a cathode coupled to the collector of said second transistor; and a fourth transistor having a base coupled to the cathode of said diode, an emitter coupled to said input voltage and a collector coupled to the base of said current limiting transistor and to the collector of said first transistor.

* * * * *